United States Patent [19]
Roberts

[11] 3,821,044
[45] June 28, 1974

[54] STABILIZATION OF ALUMINUM HYDRIDE
[75] Inventor: Charles B. Roberts, Midland, Mich.
[73] Assignee: The Dow Chemical Company, Midland, Mich.
[22] Filed: June 24, 1968
[21] Appl. No.: 740,831

[52] U.S. Cl. .................. 149/109, 117/100 B, 149/5, 149/6, 423/645, 23/293 R
[51] Int. Cl. ........................ C06b 19/00, C01b 6/00
[58] Field of Search .............. 23/204, 365; 260/448; 149/109; 423/645

[56] References Cited
UNITED STATES PATENTS
3,405,130   10/1968   Hogsett et al...................... 260/448
3,417,119   12/1968   Ehrlich ............................. 260/448

Primary Examiner—Leland A. Sebastian
Attorney, Agent, or Firm—C. Kenneth Bjork

[57] ABSTRACT

The invention is a process for upgrading the thermostability of light metal hydrides, particularly substantially non-solvated, crystalline aluminum hydrides, which may contain small amounts of magnesium values, by contacting the hydride with an aqueous solution buffered at from about pH 6 to about 8, preferably at about 7, at a maximum temperature of about 70° C., preferably about room temperature, for a period of time and separating the so-treated product from the aqueous solution. Crystalline Aluminum hydride is useful as a fuel component in rocket propellants.

8 Claims, No Drawings

STABILIZATION OF ALUMINUM HYDRIDE

BACKGROUND OF THE INVENTION

The invention herein described was made in the course of or under a contract or subcontract thereunder, with the Department of the Air Force, Contract No. FO 4611-68-C-0067.

This invention is concerned with the stabilization of light metal hydrides and more particularly is concerned with a novel process for improving the thermostability of substantially non-solvated crystalline aluminum hydrides.

Light metal hydrides, e.g., substantially nonsolvated, crystalline aluminum trihydrides, find utility as fuel components in solid rocket propulsion systems, as gas generators and in other similar operations. In particular, a substantially non-solvated, ether insoluble, crystalline aluminum hydride (hereinafter referred to as alpha-aluminum hydride) having a hexagonal crystal structure, a specific well-defined X-ray diffraction pattern and a density of over 1.4 grams per cubic centimeter has been found to be an especially desirable fuel for solid rocket propulsion systems. This compound has been disclosed in application Ser. No. 179,509 by Norman E. Matzek and Donald F. Musinski. However, at temperatures above about 60° C. this material both during storage and when used in a propellant grain tends to undergo detrimental spontaneous decomposition with time liberating gaseous hydrogen. Additionally, it has been found that to a certain degree undesirable decomposition may occur with long term storage at ambient temperature, i.e., from about 18 to about 25° C., for example.

Some increase in the thermostability of this and other non-solvated aluminum hydride materials has been realized by coating the surface of these compounds with either an inert coating or with materials which react with aluminum hydride to give a relatively inert surface layer. Examples of such materials are nitrogen oxide, $N_2F_4$, oxygen, carbon dioxide, volatile inorganic chlorides, volatile inorganic sulfides, triethylene glycol dinitrate, diphenylacetylene and carbon tetrachloride.

It also has been found that by incorporating magnesium values in an amount of at least about 0.01, and usually from about 0.1 to about 3 or more weight per cent, based on the weight of the light metal hydride, into the crystal lattice of the light metal hydride, the thermostability of the resulting light metal hydride composition is markedly increased over that shown by the non-magnesium containing product. This improved stability particularly is shown with substantially non-solvated, crystalline aluminum hydride having from about 0.4 to about 2 weight per cent magnesium incorporated into the lattice.

Ordinarily, preparation of this latter product is achieved by adding a finely divided magnesium source material, usually a substantially anhydrous magnesium salt, magnesium organometallic or a binary magnesium hydride or complex magnesium hydride, directly to a reaction mixture during the preparation of the light metal hydride. This assures that the magnesium is quite uniformly dispersed throughout the lattice in the resulting stabilized product.

In a preferred embodiment for preparing a substantially non-solvated, crystalline aluminum hydride having magnesium in the crystal lattice, a magnesium halide, e.g., magnesium chloride, and a liquid aromatic hydrocarbon, e.g., benzene, which is miscible with ether are introduced into and mixed with agitation in a reaction mixture of aluminum chloride and alkali metal aluminum hydride, e.g., $LiAlH_4$ or $NaAlH_4$ in ether, e.g. diethyl ether, used to prepare aluminum hydride. Ordinarily, the lithium aluminum hydride-aluminum chloride reactants range in a gram mole ratio of 3 to 4 ($LiAlH_4/AlCl_3$) based on that required stoichiometrically for aluminum hydride formation. Following the reaction period, ether is removed from the product mixture by heating at a temperature of from about 40 to about 140° C., ordinarily in the presence of a complex borohydride such as lithium borohydride, sodium borohydride or excess of the alkali metal aluminum hydride, thereby to provide a crystalline, substantially non-solvated aluminum hydride containing a predetermined amount of magnesium. Generally, the amount of complex hydride used is such that there is from about ¼ to about 1 mole of the complex hydride present for each mole of aluminum hydride product.

Substantially non-solvated large-sized, particulate, crystalline alpha-aluminum hydride particles ranging from about 10 to about 50 microns or larger form directly in the reaction solution if the temperature is maintained at from about 50 to about 85° C. and preferably at from about 60 to about 80° C., and most desirably at about 75°–77° C. This result is unexpected in view of the fact that the product obtained from the same solutions at lower temperatures is substantially completely solvated and of undesirably small sized, e.g. sub-micron particles.

In carrying out this process with low boiling ether solvents the desired crystallization temperatures are obtained by controllably increasing the pressure on the solution while heating thereby to raise the effective boiling point of the solution and give a predetermined reaction temperature. Alternatively, and preferably, an ether solution of aluminum hydride is introduced into an inert organic liquid having a higher boiling point than the ether, and preferably above about 80° C., to provide a solution having a normal boiling point of at least 50° C. This eliminates the need for use of superatmospheric pressure. Liquid hydrocarbons, preferably having a boiling point of above 80° C., such as for example, benzene, toluene, biphenyl, xylene, biphenyl benzene, decane and the like have been found to be particularly suitable.

Usually, in the preparation of the magnesium containing product, finely divided, substantially anhydrous magnesium source material, is added to an agitated reaction mixture. The resultant mix is stirred or otherwise agitated for a period of at least about 3 minutes, ordinarily from about 5 minutes to about 1.5 hours or more and usually from about 10 minutes to about 1 hour.

The temperatures employed are not critical, the process being operable at temperatures normally employed in light metal hydride preparation.

By eliminating the magnesium value containing reactant from the reaction mixture, this method produces alpha-aluminum hydride.

Additionally, it has been found that the thermostability of non-solvated, crystalline aluminum hydrides and such aluminum hydrides having magnesium values incorporated into the crystal lattice can be still further markedly improved over that realized heretofore if the resulting crystalline aluminum hydride product material is maintained at a maximum temperature of about 0° C. for a period of at least about 4 months prior to use, and preferably is stored at a maximum temperature of about minus 5° C., ordinarily at least at about minus 15° C., and usually at from about minus 15° C. to about minus 200° C. under a substantially inert atmosphere for a period of at least about 6 months or more prior to use. In general, within the disclosed temperature range, as the storage time increases, the thermal stability also increases.

For optimum enhancement in thermal stability by this cold temperature storage, it has been found that the aluminum hydride should be placed in the requisite low temperature atmosphere promptly after manufacture as materials which have been stored at ambient temperature for a period of time usually undergo some deterioration and autodecomposition and upon subjection to elevated temperature many times exhibit a decreased thermal stability.

Atmospheres particularly suitable for use in the cold temperature-long term storage process are nitrogen, argon, hydrogen, helium and the like which do not react with or attack the crystalline, substantially non-solvated aluminum hydride product. Generally, the atmosphere used is substantially anhydrous; however, no detrimental effect on subsequent thermostability of the aluminum hydride product is found on samples subjected to low temperature wherein the atmosphere contains water or water vapor such that up to about 2 per cent hydrolysis of the aluminum hydride occurs.

In still another process the thermostabilization of such aluminum hydride materials is obtained by incorporating small quantities of an alkyl or aryl substituted silicol, i.e., a silicoalkyl- or silicoaryl compound, into the product. In this process an alkyl or aryl substituted silicol is incorporated into the lattice of the aluminum hydride to provide in the substantially non-solvated, crystalline aluminum hydride product a molar ratio of silicol/aluminum hydride of from about 0.2 to about 0.001, ordinarily from about 0.1 to about 0.005. This is achieved by following the general preparation set forth hereinbefore for alpha-aluminum hydride or magnesium containing alpha-aluminum hydride.

Each of the hereinbefore listed processes or techniques has been found to increase the thermostabilization of aluminum hydride to some degree over that shown by the base material itself.

It is a principal object of the present invention to provide a novel process for increasing the thermostabilization of a substantially non-solvated crystalline aluminum hydride which gives an unexpectedly large increase in stabilization of the product.

It is another object of the present invention to provide a simple process for treating aluminum hydride either with or without magnesium or other moieties in the crystal lattice to provide markedly increased resistance to thermodegradation and whereby the resistance to autodecomposition or degradation at ambient room temperature is enhanced for extended periods of time.

It is also an object of the present invention to provide a process for increasing the thermostability of aluminum hydride which simultaneously serves to remove aqueous soluble contaminant impurities from the hydride product.

These and other objects and advantages of the present invention readily will become apparent from the detailed description presented herein.

SUMMARY OF THE INVENTION

In general, the present process comprises contacting at a temperature below about 70° C. for a period of at least about 15 minutes a substantially non-solvated aluminum hydride with an aqueous solution buffered to a pH range of from about 6 to about 8, separating the so-treated aluminum hydride from the aqueous treating bath and drying the resulted product. Usually the so-treated product is washed with water prior to the drying stage. The drying itself is preferably carried out in an inert atmosphere to remove the bulk of the aqueous treating or wash solution followed by treatment under low pressure to remove the last traces of moisture from the aluminum hydride product.

DESCRIPTION OF PREFERRED EMBODIMENTS

In a preferred embodiment of the present invention a particulate, substantially anhydrous, crystalline alpha-aluminum hydride or an alpha-aluminum hydride having magnesium values incorporated into the crystal lattice is contacted at a temperature of from about 15° to about 70° C., usually from about 15 to about 60° C. and ordinarily at about room temperature, i.e., from about 18° to about 25° C. with water which has been buffered at from about pH 6 to about 8, preferably at about pH 7. The aluminum hydride and aqueous buffer solution are maintained in contact for a period of at least about 15 minutes. Marked increase in the stabilization against thermodegradation is found at this short contact time. However, by extending the contact time for as long as 20 days or more further increase in the thermal stability of the product is realized.

Following the treatment step, the solid aluminum hydride is separated, ordinarily by filtration or centrifuging, from the residual liquid and dried.

Usually, the treated product is washed several times with water prior to drying. This wash serves to elute or remove additional quantities of aqueous soluble impurity byproducts such as chloride ion, lithium ion and the like normally associated with the alpha-aluminum hydride materials because of method of their preparation. Ordinarily, the separation is carried out under an inert atmosphere, e.g., argon or nitrogen, but use of such a medium is not critical.

The so-treated aluminum hydride product is dried, as by passing a stream of dry gas, e.g., nitrogen, usually at about room temperature therethrough followed by a final drying under a low absolute pressure, e.g., ~ a maximum of 0.1 millimeter mercury absolute. Ordinarily, this latter step is carried out at about room temperature or up to about 100° C. or more.

The relative quantities of buffer solution and particulate aluminum hydride to be employed are not critical. It is only necessary that there be sufficient solution to at least completely wet the hydride. Large volumes of solution far in excess of that volume or weight of solid product being treated generally are avoided as these provide unnecessary problems in material transport and filtering as well as require unduly large reactors and material handling equipment.

In actual practice it has been found that treating solution volume/aluminum hydride weight ratios of from 5 to 20 or more, usually of from about 10 to about 15, have been quite satisfactory.

The residual aqueous buffered treating solution can be recovered, the pH adjusted, if necessary, by addition of buffer solute, and this then be reused for additional treatment if desired.

Buffer solutions suitable for use in the practice of the present invention are those aqueous systems which provide the requisite pH. One particularly effective treating bath is an aqueous solution which is 0.035 molar in potassium dihydrogen phosphate and 0.027 molar in soidium hydroxide. This solution is buffered at pH 7. A list of exemplary buffer solutions and their respective pH values is given in Table I which follows. These are not meant to be inclusive but are illustrative of various operable buffers.

TABLE I

| Example No. | Buffer Solution | Temp. °C. | pH |
|---|---|---|---|
| 1 | 50 ml. of 0.1 M $KH_2PO_4$+5.6 ml. of 0.1 M NaOH | 25 | 6.00 |
| 2 | 50 ml. of 0.1 M $KH_2PO_4$+46.1 ml. of 0.1 M NaOH | 25 | 8.00 |
| 3 | 50 ml. of 0.1 M tris(hydroxymethyl)-aminomethane+46.6 ml. of 0.1 M HCl | 25 | 7.00 |
| 4 | 50 ml. of 0.025 M borax+20.5 ml. of 0.1 M HCl | 25 | 8.00 |
| 5 | 0.025 M $KH_2PO_4$ and 0.025 M $Na_2HPO_4$ | 0-95 | ~7.0–6.83 |
| 6 | 0.15 M $NaHCO_3$+0.1 M $NH_4C_2H_3O_2$ | 25 | ~7 |

In one preferred embodiment of the present invention it has been found that a stabilized aluminum hydride which has been subjected to treatment in an alkylamine, hydrazine or an alkylhydrazine as disclosed in a copending application "Stabilization of Light Metal Hydride" by Earl Thomas Niles, Beverly A. H. Seaman and Edwin J. Wilson, Serial No. 740,830, filed June 24, 1968, can be further stabilized by the practice of the present invention to provide an unexpected remarkably high resistance to thermodegradation.

The present novel process can be carried out in batch, cyclic batch, or continuous operations.

The following Example will serve to further illustrate the present invention but is not meant to limit it thereto.

EXAMPLE - PREPARATION OF CRYSTALLINE ALUMINUM HYDRIDE MATERIALS

Alpha-aluminum hydride and magnesium containing alpha-aluminum hydride products were prepared by the following general procedure.

A solution of aluminum hydride was prepared by mixing at room temperature about a 1 molar diethyl ether solution of aluminum chloride ($AlCl_3$) and about a 1 molar diethyl ether solution of lithium aluminum hydride ($LiAlH_4$) to provide a $LiAlH_4/AlCl_3$ ratio in the resulting reaction mixture, on a gram mole basis, of about 4. The mixture was filtered, to remove precipitated lithium chloride therefrom, into about a 1 molar diethyl ether solution of lithium borohydride.

At this stage of the process, for those preparations wherein magnesium was to be incorporated into the crystal lattice of the aluminum hydride product, ground magnesium chloride was added to the reaction mixture. Generally this additament was employed in an amount calculated to provide about 2 weight per cent magnesium in the final product.

Benzene in an amount to produce a solution containing about 30 volume per cent ether was added to the reaction mass in both preparations.

The resulting mixture was stirred for about 20 minutes, filtered into a reaction flask and the reaction flask connected to a distillation column. The reaction flask with the product solution was heated with controlled ether removal, if needed, to provide a final reflux temperature of about 76°–77° C. The reaction mass was heated under total reflux at this temperature for a period of from about 1 to about 2.5 hours. White crystalline particles formed in the reactor during the reflux. These particles continued to grow in size during the reflux period. Following the reflux operation, the reaction vessel containing the white crystalline product was removed from the distillation column, the solid product separated by filtering, and, washed with diethyl ether. The so-recovered particulate aluminum hydride materials were dried at ambient temperature, i.e. ~18°–25° C., under a pressure of about $1\times10^{-3}$ millimeter mercury absolute.

All manipulative and operating procedures were carried out in the presence of a substantially anhydrous nitrogen atmosphere and all reactants, solvents and liquid carriers were substantially moisture-free.

Unit cell dimensions for a sample of the magnesium containing product as calculated from an X-ray powder diffraction pattern of the hexagonal crystal structure product material were found to be $a$=4.453A, $C$=5.916$_5$A.

The unit cell dimensions calculated for an aluminum hydride product prepared by the same procedure, except that no magnesium values had been incorporated into the crystal lattice structure, were $a$ =4.450$_2$A, $C$=5.906$_6$A. These are consistent for alpha-aluminum hydride. The increase in lattice constants for the magnesium containing product indicates the magnesium values are incorporated into the hexagonal crystal lattice structure of the aluminum hydride thereby giving an expanded unit cell.

STABILIZATION OF CRYSTALLINE ALUMINUM HYDRIDE a. An aqueous solution buffered at pH 7 was prepared by dissolving potassium dihydrogen phosphate ($KH_2PO_4$) and sodium hydroxide (NaOH) in water to provide a solution that was 0.035 molar in $KH_2PO_4$ and 0.027 molar in NaOH.

Samples of both magnesium containing alpha-aluminum hydride and alpha-aluminum hydride without the magnesium value inclusion for several different batches were mixed with separate portions of the buffer solution at room temperature and the resulting mixture allowed to stand for about 15 minutes. In these tests a treating solution volume/aluminum hydride weight ratio of about 10 was employed. After this period the buffer solution was decanted from the reaction mass, the solids washed with 3 successive water washes and the so-treated product dried first by passing a nitrogen stream at room temperature in contact with the solid particles followed by subjecting the product to a low pressure (~ about 0.001 mm Hg absolute) at room temperature for about 18 hours (overnight) to remove the last of the moisture therefrom.

The resulting treated aluminum hydride products were subjected to storage at 60° C. and 100° C. and the thermal stability, i.e., per cent decomposition at test temperature, as measured using a standard Taliani test apparatus, was determined. For use in propellant applications, the standard of acceptance is that there be a maximum of 1 per cent decomposition in 10 days at 60° C. storage.

Additionally, elemental chemical analyses were run on the original aluminum hydride products and the corresponding material stabilized by treatment in accordance with the present novel process.

Table II summarizes the results of the analytical studies.

Table III shows the time to reach 1 percent hydrolysis for these aluminum hydride materials.

The results presented in Table II show the unexpected beneficial affect of the present novel process in purification of the aluminum hydride product by removal of impurities such as chloride ion, lithium values and carbon remaining after the preparation of the original product. These results also demonstrate that the present process produces substantially no change in the aluminum and hydrogen content of the product nor does it introduce detrimental amounts of oxygen into the treated product.

In the decomposition studies summarized in Table III, the sample numbers correspond to those presented in Table II.

was extended to 216 hours with samples being taken at periodic intervals during this time. An analysis for oxygen content was made for each sample; each sample also was subjected to storage at 100° C. and its thermal stability measured using a standard Taliani test apparatus.

TABLE II

| Sample No. | Aluminum hydride product | | Elemental analysis (weight percent) | | | | | | |
|---|---|---|---|---|---|---|---|---|---|
| | Description | Condition | Al | H | C | Mg | Cl | Li | O |
| 1A | Mg containing | as received | 87.50 | 9.80 | 0.18 | 1.05 | 0.26 | 0.23 | 0.23 |
| 1B | do | stabilized | 87.35 | 9.86 | 0.15 | 1.07 | 0.10 | 0.21 | 1.31 |
| 2A | Mg containing | as received | 86.60 | 10.12 | 0.40 | 1.15 | 0.67 | 0.39 | |
| 2B | do | stabilized | 86.60 | 9.74 | 0.10 | 1.15 | 0.08 | 0.22 | |
| 3A | Mg containing | as received | 87.70 | 9.94 | 0.31 | 1.02 | 0.34 | 0.34 | |
| 3B | do | stabliized | 87.70 | 9.90 | 0.10 | 1.33 | 0.06 | 0.23 | |
| 4A | No Mg | as received | | | | | | | |
| 4B | do | stabilized | 88.70 | 10.03 | 0.20 | | < 0.05 | 0.20 | 0.48 |
| 5A | No Mg | as received | 88.70 | | | | < 0.10 | | |
| 5B | do | stabilized | 88.30 | 9.97 | 0.15 | | < 0.05 | 0.25 | 1.16 |

TABLE III

| Sample No. | Time (hrs.) to 1% Decomposition 100° C. | Time (days) to 1% Decomposition 60° C. |
|---|---|---|
| 1A (original) | 4.1 | 8 |
| 1B (stabilized) | 8.9 | 26 |
| 2A (original) | 3.2 | 7 |
| 2B (stabilized) | 6.7 | 25 |
| 3A (original) | 3.0 | 7.5 |
| 3B (stabilized) | 5.4 | ~15 | b. A fresh portion of the aluminum hydride material, Sample No. 1A, was treated with the same type of buffer solution using the same procedure as set forth for run (a). In this study, the ultimate time of treatment The results of this study are summarized in Table IV

TABLE IV

| Run No. | Treatment Time | Oxygen Content in Sample (%) | Stability Time to 1% Decomposition at 100° C. (hrs.) |
|---|---|---|---|
| Control | 0 min. | 0.23 | 4.1 |
| 1 | 2 min. | 0.88 | 6.5 |
| 2 | 5 min. | 1.06 | 8.0 |
| 3 | 10 min. | 1.43 | 8.1 |
| 4 | 45 min. | 0.98 | 9.3 |
| 5 | 16 hrs. | 1.09 | 9.3 |
| 6 | 117 hrs. | 2.05 | 11.3 |
| 7 | 216 hrs. | 2.44 | 12.5 | c. Several different high purity magnesium containing aluminum hydride products were treated for either 10 days or 17 days following the same procedure and employing the same type buffer solution as set forth in run (a).

The resulting products were stored at 100° C. and the time to reach 1 percent decomposition at this temperature was determined using a standard Taliani test apparatus. Also, the material which had been given a 10 day treatment was tested at 60° C. As controls, the untreated material was subjected to the same storage conditions.

Table V summarizes the results of the analyses for the materials.

Table VI shows the time for the various products to reach 1 per cent hydrolysis.

In the decomposition studies summarized in Table VI, the sample numbers correspond to those of Table V.

TABLE V

| Sample No. | Condition | Treatment time (days) | Elemental analysis (weight percent) | | | | | | |
|---|---|---|---|---|---|---|---|---|---|
| | | | Al | H | C | Mg | Cl | Li | O |
| 6A | as received | | 87.8 | 10.04 | >1 | 1.40 | 0.05 | 0.14 | |
| 6B | stabilized | 10 | 86.0 | 9.45 | 0.5 | 1.55 | < 0.05 | | 2.89 |
| 6C | do | 17 | 84.1 | 8.99 | 0.1 | 1.49 | < 0.05 | 0.16 | 5.06 |
| 7A | as received | | 87.7 | 9.95 | >1 | 1.66 | < 0.05 | 0.16 | |
| 7B | stabilized | 10 | 85.2 | 9.48 | 0.4 | 1.62 | < 0.05 | 0.15 | 3.19 |
| 7C | do | 17 | 82.7 | 9.33 | 0.25 | 1.66 | < 0.05 | | 5.71 |
| 8A | as received | | 87.9 | 9.95 | >1 | 0.86 | 0.24 | 0.13 | |
| 8B | stabilized | 10 | 87.3 | 9.50 | 0.25 | 0.91 | < 0.05 | 0.13 | 2.04 |
| 8C | do | 17 | 86.1 | 9.56 | 0.1 | 0.90 | < 0.05 | | 3.60 |

TABLE VI

| Sample No. | Time to 1% Decomposition at 100° C. (hrs.) | Time to 1% Decomposition at 60° C. (days) |
| --- | --- | --- |
| 6A | 9 | 27 |
| 6B | 22 | (a) |
| 6C | 23 | — |
| 7A | 11.6 | 32 |
| 7B | 33 | (b) |
| 7C | 32 | — |
| 8A | 11 | 32 |
| 8B | 16.1 | (c) |
| 8C | 14 | — |

(a) showed 0.30% decomposition after 49 days.
(b) showed 0.25% decomposition after 49 days.
(c) showed 0.53% decomposition after 49 days.

d. About 40 parts by weight of a relatively impure magnesium containing aluminum hydride was slurried under an inert atmosphere in about 60 parts by weight n-butylamine containing about 2 per cent water. The resulting mixture was heated to 60° C. and held at that temperature for about 20 days at about atmospheric pressure. Following this period the mixture was cooled to room temperature and the n-butylamine removed. The solid aluminum hydride product was washed with fresh n-butylamine, filtered and dried at a reduced pressure at room temperature.

A portion of the so-treated aluminum hydride was subjected to a 15 minute treatment using the buffer composition and process described in run (a).

The n-butylamine treated material and the material which had been given the post treatment with buffer solution were tested at 60° C. in a standard Taliani apparatus and the time to reach one per cent decomposition determined. The n-butylamine treated aluminum hydride took 33 days to reach this decomposition point while that material which had received the buffer solution post treatment took 43 days to undergo this amount of decomposition.

In a separate study, a similar butylamine treated aluminum hydride product was subjected to a 45 minute post-treatment with the buffer solution.

The n-butylamine treated product and the post buffer treated material were admixed with separate portions of triethyleneglycol dinitrate, commonly employed as a plasticizer in solid propellants and believed to be a prime source leading to decomposition of aluminum hydride in such compositions. The resulting blends were tested at 60° C. in a Taliani apparatus. After 15 days the n-butylamine treated product showed only 0.16 per cent decomposition while that which had been given the buffer post treatment exhibited a still further reduced decomposition of only 0.129 per cent.

These values both are markedly reduced from that exhibited by an untreated aluminum hydride.

e. The study described in run (a) was repeated using an aqueous buffer solution (pH 7) of about 0.15 M sodium bicarbonate and 0.1 M ammonium acetate. The resultant aluminum hydride product exhibited thermostability comparable to that reported in run (a).

Other buffer solutions providing a pH of from about 6 to about 8 as disclosed hereinbefore, for example, can be used to treat crystalline aluminum hydride products in accordance with the procedure described for the foregoing examples to increase their resistance to degradation and decomposition at elevated temperatures.

Various modifications can be made in the present invention without departing from the spirit or scope thereof for it is understood that I limit myself only as defined in the appended claims.

I claim:

1. A process for increasing the thermostability of a substantially non-solvated aluminum hydride which comprises;
   a. contacting a substantially non-solvated aluminum hydride at a temperature below about 70° C. for a period of at least about 15 minutes with an aqueous solution buffered to a pH range of from about 6 to about 8,
   b. separating the so-treated aluminum hydride product from the aqueous treating bath, and
   c. drying said aluminum hydride product.

2. The process as defined in claim 1 wherein the aqueous solution is buffered at about pH 7.

3. The process as defined in claim 1 wherein the aluminum hydride and buffer solution are maintained in contact at room temperature for a period of from about 15 minutes to about 20 days.

4. The process as defined in claim 1 and including the step of washing the so-treated product after separation from the aqueous treating bath.

5. The process as defined in claim 1 wherein the aluminum hydride is a substantially non-solvated hexagonal, crystalline aluminum hydride.

6. The process as defined in claim 1 wherein the aluminum hydride is a substantially non-solvated, hexagonal crystalline aluminum hydride having from about 0.1 to about 3 weight per cent of magnesium values incorporated into its crystal lattice.

7. The process as defined in claim 1 wherein the aqueous solution is buffered with an aqueous solution which is 0.035 molar in potassium dihydrogen phosphate and 0.027 molar in sodium hydroxide.

8. The process as defined in claim 1 wherein the aqueous solution is buffered with an aqueous solution which is 0.15 molar in sodium bicarbonate and 0.1 molar in ammonium acetate.

* * * * *